Sept. 8, 1959 W. H. BIXBY 2,903,640
CURRENT SUPPLY APPARATUS
Filed July 2, 1957

INVENTOR
W. H. BIXBY
BY
*G. F. Heuerman*
ATTORNEY

United States Patent Office 2,903,640
Patented Sept. 8, 1959

2,903,640

CURRENT SUPPLY APPARATUS

William H. Bixby, Columbus, Ohio, assignor to Power Equipment Company, Galion, Ohio, a corporation of Michigan Application July 2, 1957, Serial No. 669,645

8 Claims. (Cl. 321—19)

This invention relates to current supply apparatus and particularly to improved regulated rectifying apparatus.

An object of the invention is to provide a regulating circuit having a transistor regulator and a saturable reactor regulator for controlling the voltage supplied to the transistor regulator.

Another object is to protect a transistor from excessive voltage across a pair of transistor electrodes and from excessive dissipation in the transistor.

In a specific embodiment of the invention, herein shown and described for the purpose of illustration, there is provided a series transistor regulator comprising a transistor-amplifier responsive to load voltage changes for controlling the voltage drop across the series transistor to thereby minimize the load voltage changes. The series transistor may be damaged by excessive voltage across a pair of its electrodes, such as the emitter and collector electrodes or the base and collector electrodes. The series transistor may also become damaged due to excessive power dissipation within the transistor. To avoid damaging the series transistor, a saturable reactor regulator is provided for regulating the input voltage to the transistor regulator under joint control of the voltage across a pair of electrodes of the series transistor and the load current transmitted through the series transistor. The output voltage of the saturable reactor regulator is controlled so as to suitably limit the voltage across the series transistor for relatively small values of load current and so that the voltage across the series transistor decreases with increasing load current to limit the dissipation within the transistor at relatively high values of load current.

Preferably the saturable reactor is provided with two control windings, one of the windings being connected in series with the load and the other being connected across the emitter-collector path of the series transistor. It has been found that the voltage across the series transistor will decrease as the load current is increased if the winding in series with the load has sufficient turns. Increasing the number of turns in this winding will cause the voltage across the transistor to decrease at a faster rate with increasing load current.

Figure 1:
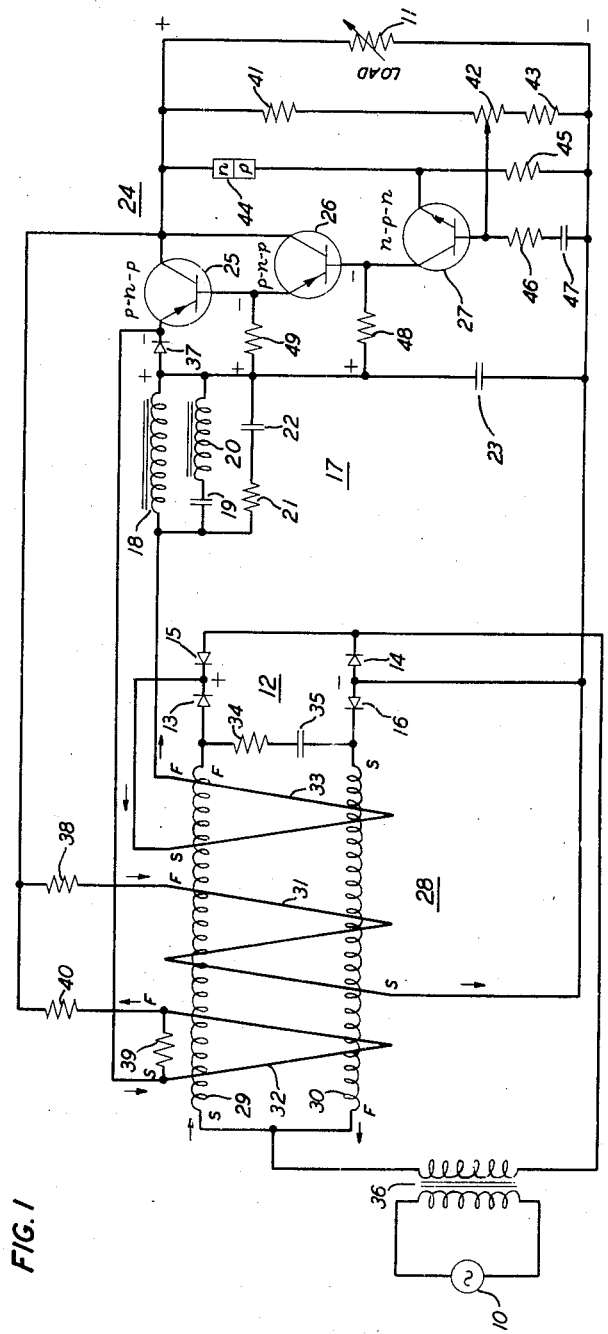
Figure 2:
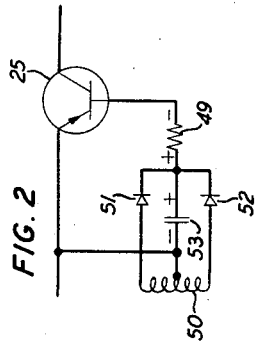

The invention will now be described in greater detail with reference to the accompanying drawing in which:

Fig. 1 is a schematic view of a current supply circuit embodying the invention; and Fig. 2 is a schematic view of a modification of a portion of the circuit of Fig. 1.

Referring now to the drawing, there is provided a circuit for rectifying current from an alternating-current supply source 10 and for supplying the rectified current to a load 11. The current is rectified by a rectifier 12 comprising rectifying elements 13, 14, 15 and 16 and there is provided a ripple filter 17 for suppressing alternating components of the rectified current. The ripple filter is of the type disclosed in United States Patent 1,568,144 to H. W. Elsasser, January 5, 1926, and in my copending application Serial No. 659,720, filed May 16, 1957. The ripple filter 17 comprises, in addition to a shunt condenser 23, a series impedance network which, in turn, comprises an inductor 18 in a first of three parallel branch paths, a condenser 19 and an inductor 20 in series in a second of the branch paths and a resistor 21 and a condenser 22 in series in the third branch path. There are also provided a series transistor regulator 24 comprising p-n-p type transistors 25 and 26 and an n-p-n type transistor 27, each transistor having electrodes comprising an emitter, a collector and a base, and a saturable reactor regulator 28 comprising impedance or power windings 29 and 30, a bias winding 31 and two saturating or control windings 32 and 33. A current path comprising a resistor 34 and a condenser 35 in series is connected from the common terminal of rectifying element 13 and winding 29 to the common terminal of rectifying element 16 and winding 30.

The alternating-current supply source 10 is connected to the primary of a transformer 36. One terminal of the secondary of transformer 36 is connected to the common terminal of windings 29 and 30 and the other terminal of the secondary transformer winding is connected to a common terminal of rectifier elements 14 and 15. Windings 29 and 30, preferably having the same number of turns, may be similarly wound on the outer legs, respectively, of a three-legged core of magnetic material going from a start "S" to a finish "F" terminal. Windings 31, 32 and 33 may each be similarly wound from the S to the F terminal on the center leg of the core.

One of the circuits for supplying current to the load may be traced from the upper terminal of the secondary of transformer 36, when it is positive with respect to the potential of the lower terminal, through winding 29, rectifier element 13 into the S terminal and out of the F terminal of winding 33, inductor 18 of the series impedance network of ripple filter 17, through a rectifier element or diode 37, into the emitter and out of the collector of series transistor 25, through the load 11 and from the negative terminal of the load 11 through rectifier element 14 to the lower terminal of the secondary transformer winding. A similar unidirectional current path may be traced from the lower terminal of the secondary winding of transformer 36, when it is positive, through rectifier element 15, winding 33, inductor 18, rectifier element 37, transistor 25, load 11, rectifier element 16 and winding 30 from terminal S to terminal F and thence to the upper terminal of the secondary transformer winding.

A current path for energizing the bias winding 31 may be traced from the positive load terminal through a resistor 38 to the F terminal of winding 31 and from its S terminal to the negative load terminal. A resistor 39 is connected across the winding 32. Winding 32 is connected across the emitter-collector path of transistor 25, the S terminal of winding 32 being connected to the emitter and the F terminal of winding 32 being connected through a resistor 40 to the collector.

Two parallel current paths are provided across the load. One of the paths comprises in series a resistor 41, a potentiometer 42 and a resistor 43. The other of the parallel paths comprises in series a constant voltage p-n junction diode 44 and a resistor 45. The emitter of transistor 27 is connected to the common terminal of diode 44 and resistor 45. The base of transistor 27 is connected to the variable tap of potentiometer 42. The base of transistor 27 is also connected through a resistor 46 and a condenser 47 in series to the negative load terminal. The collector of transistor 27 is connected directly to the base of transistor 26 and also through a resistor 48 to the common terminal of filter inductor 18 and diode 37. The collector of transistor 26 is connected to the positive load terminal. The emitter of transistor 26 is directly connected to the base of transistor 25 and through a resistor 49 to the common terminal of inductor 18 and diode 37.

The load current flowing through the diode 37 sets up across its terminals a bias voltage for biasing the emitter of transistor 25 negatively with respect to its base. Instead of using the rectifier element or diode 37 in series with the load for setting up a biasing voltage in the emitter-base circuit of transistor 25, a full-wave rectifier may be used, for example, as shown in Fig. 2. The rectifier comprises a winding 50, rectifier elements 51 and 52 and a filtering condenser 53. The winding may be wound on the core of transformer 36 or on the core of inductor 18, for example. Fig. 2 shows how the rectifier 50, 51, 52, 53 may be connected in the series circuit comprising resistor 49 and the emitter-base path of transistor 25.

The currents flowing through the several windings of the saturable reactor 28 are in the directions indicated by arrows in Fig. 1. The magnetomotive force produced in the magnetic circuits of the saturable reactor by the current supplied to winding 31 aids the magnetomotive forces due to windings 29 and 30, respectively. The magnetomotive forces set up by the currents supplied to windings 32 and 33, respectively, are opposed to the magnetomotive forces due to windings 29 and 30, respectively. Since the circuit operates to maintain the load voltage substantially constant, the current supplied to bias winding 31 is also substantially constant.

The current supply circuit operates to maintain the load voltage substantially constant for any fixed setting of the potentiometer 42. To understand the operation of the current supply circuit, let it be assumed that the load voltage increases by a small amount due to an increase of the voltage of the supply source 10, for example. This will cause the base of transistor 27 to become relatively less positive or more negative with respect to its emitter and thus cause the current flowing through resistor 48 into its collector to decrease. The emitter of transistor 26 thus becomes relatively less positive with respect to its base to cause the current flowing through resistor 49 into the emitter and out of the collector of transistor 26 to decrease. The emitter of transistor 25 therefore becomes relatively less positive with respect to its base with the result that the voltage drop across the emitter-collector path of transistor 25 is increased. The assumed increase of load voltage is thus minimized.

The output voltage of the saturable reactor controlled rectifier and ripple filter 12, 28, 17 appears across the filter condenser 23. Neglecting the voltage drop across the diode 37, this voltage across condenser 23 will exceed the load voltage by a voltage equal to or less than the maximum safe voltage across the emitter-collector path of transistor 25.

Assuming that the load current is fixed and of relatively small amplitude, an increase of the voltage across the emitter-collector path of transistor 25 will produce an increase of current flowing through the control winding 32. As a result the impedance of the windings 29 and 30 is increased to cause a reduction of the voltage across condenser 23, thereby minimizing the increase in voltage across the emitter-collector path of transistor 25.

Similarly, a decrease of the voltage drop across the emitter-collector path of transistor 25 will cause an increase of the voltage across condenser 23 which, in turn, will cause the voltage drop across the emitter-collector path of transistor 25 to increase. Therefore, this portion of the circuit functions to minimize the changes of voltage across the emitter-collector path of transistor 25 to prevent excessive voltage across the electrodes of transistor 25 such as might cause damage to the transistor.

An increase of the load current flowing through the control winding 33 also increases the impedance of the impedance or power windings 29 and 30 of the saturable reactor 28. Therefore, as the load current increases, the voltage across condenser 23 decreases and, since the series transistor regulator 24 functions to hold the load voltage substantially constant, the voltage drop across the emitter-collector path of transistor 25 decreases. This decrease of voltage across the emitter-collector path of transistor 25 in response to an increase of load current limits the power dissipation within the transistor sufficiently to avoid damage to the transistor.

Using a current supply circuit of the type shown in Fig. 1, it was determined experimentally that the relationship between the voltage drop across the emitter-collector path of transistor 25 and the load current can be varied to obtain a desired relationship by changing the number of turns of the winding 33 through which the load current flows. In this experimental circuit, bias winding 31 had 500 turns and control winding 32 had 1000 turns and the resistances of resistors 38, 39 and 40 were 10,000 ohms, 300 ohms and 300 ohms, respectively. With a line voltage of the supply source 10 of 208 volts and a load voltage of 90 volts, the voltage drops across the emitter-collector path of transistor 25 for load currents of 0.17, 1.01 and 2.00 amperes were respectively 4.2, 6.0 and 6.3 volts for a winding 33 of two turns; 4.05, 5.1 and 4.5 volts for a winding 33 of five turns and 3.8, 3.6 and 1.5 volts for a winding 33 of ten turns. It will be noted from these experimental results that when using a winding 33 having ten turns, the power dissipation in transistor 25 decreases from 3.64 watts to 3.00 watts in response to an increase of load current from 1.01 amperes to 2.00 amperes.

These data show that the voltage across the emitter-collector electrodes of transistor 25 decreases as the number of turns of winding 33 is increased and that the rate of change of the transistor voltage with respect to the turns of winding 33 increases as the load current is increased. By controlling the number of turns of winding 33, the voltage across the transistor electrodes may be made to decrease at such a rate with respect to an increase of load current that the dissipation in the transistor is maintained substantially constant or, if desired, that the dissipation is decreased as the load current is increased for relatively high values of load current. The dissipation in the transistor may thus be limited so as to avoid damage to the transistor.

When the voltage across condenser 23 increases, for example, due to a change of line voltage or load current, the voltage across transistor 25 will increase substantially instantaneously, and vice versa, to maintain the load voltage substantially constant. For stability reasons the saturable reactor controlled rectifier with its output filter must be relatively slow in response to the control currents supplied to control windings 32 and 33. The function of the saturable reactor regulator is to maintain the voltage across condenser 23 within such limits that the transistor regulator is capable of compensating for the voltage changes across condenser 23 to maintain the load voltage substantially constant without exceeding the safe voltage across the emitter-collector path of transistor 25 and without exceeding the safe power dissipation within the transistor 25.

What is claimed is:

1. Apparatus for supplying current from a current supply source to a load circuit including a load, comprising a first and a second impedance means in series in said load circuit, means responsive to an increase of load voltage at a given load current for increasing the voltage drop across said second impedance means and vice versa, means responsive to an increase of voltage drop across said second impedance means for increasing the voltage drop across said first impedance means and vice versa, and means responsive to an increase of load current for further increasing the voltage drop across said first impedance means and vice versa to limit the power dissipation in said second impedance means.

2. In combination, a saturable reactor having a plurality of windings including an impedance winding and a first and a second saturating winding, a rectifier, a transistor having an emitter, a collector and a base, means for supplying rectified current from an alternating-current supply source to a load through a circuit comprising said impedance winding, said rectifier, said second saturating winding and the emitter-collector path of said transistor all in series, means for connecting said first saturating winding of said saturable reactor across said emitter-collector path, and means coupled to said load circuit for controlling the emitter-base current of said transistor.

3. In combination, a rectifier for rectifying current from an alternating-current supply source, means for supplying current from the output of said rectifier to a load and for maintaining the load voltage substantially constant, said means comprising a transistor having a plurality of electrodes, and means responsive jointly to the voltage across a pair of said electrodes and to the load current for controlling the output voltage of said rectifier.

4. In combination, means for rectifying current from an alternating-current supply source, a transistor having at least a pair of electrodes, means comprising said transistor for supplying current from said rectifying means to a load, and means responsive jointly to the load current and to the voltage across said pair of electrodes for controlling the output voltage of said rectifier.

5. In combination, means for rectifying current from an alternating-current supply source, a transistor having at least a pair of electrodes, said transistor being subject to damage due to excessive voltage across said pair of electrodes and due to excessive power dissipation within the transistor, means comprising said transistor for supplying current from said rectifying means to a load and means for preventing said damage to said transistor comprising means responsive jointly to the load current and to the voltage across said pair of electrodes for maintaining the output voltage of said rectifier within predetermined voltage limits.

6. In combination, a rectifier, a saturable reactor having an impedance winding and a first and a second control winding for controlling the impedance of said impedance winding, means for supplying current from an alternating-current supply source through said impedance winding to said rectifier, a transistor having at least a pair of electrodes, means for supplying current from said rectifier through said transistor to a load and means for controlling the output voltage of said rectifier comprising means for connecting said first control winding across said pair of electrodes and means for connecting said second control winding in series with said transistor and said load.

7. A combination in accordance with claim 6 in which there is provided means responsive to load voltage for controlling the voltage drop across said pair of electrodes to minimize changes of said load voltage.

8. In combination, a saturable reactor having an impedance winding, a bias winding, and a first and a second control winding, a rectifier, a transistor having an emitter, a collector and a base, a load, means for supplying current from an alternating-current supply source to a series circuit comprising said impedance winding, said rectifier, said first control winding, the emitter-collector path of said transistor and said load, means for controlling the base potential of said transistor with respect to its emitter potential comprising a transistor-amplifier having an output coupled to said base and an input, means for coupling said transistor-amplifier input to said load circuit, means for connecting said bias winding across said load and means for connecting said second control winding across said emitter-collector path.

References Cited in the file of this patent

UNITED STATES PATENTS

| | | |
|---|---|---|
| 2,693,568 | Chase | Nov. 2, 1954 |
| 2,751,545 | Chase | June 19, 1956 |
| 2,751,549 | Chase | June 19, 1956 |